June 30, 1970  C. SELOWITZ  3,517,712
WORKPIECE EDGE TRIMMING DEVICE
Filed March 23, 1967  2 Sheets-Sheet 1
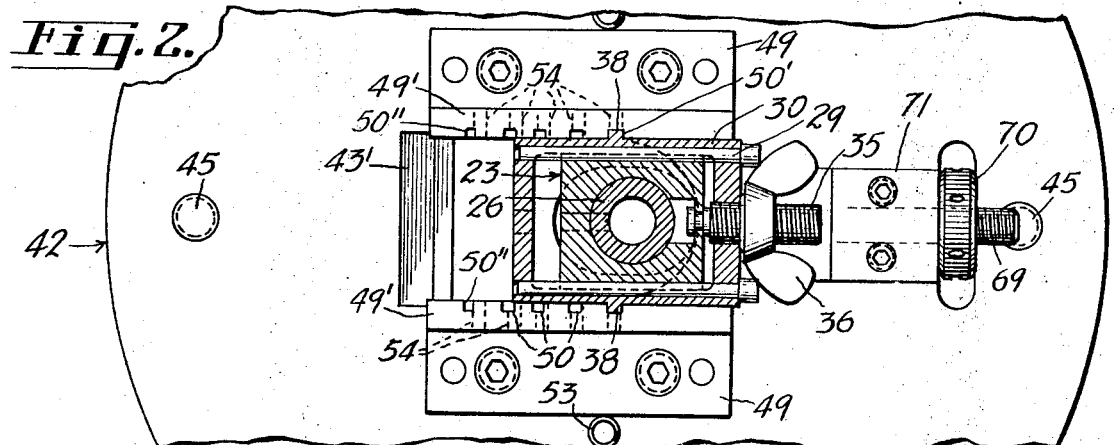
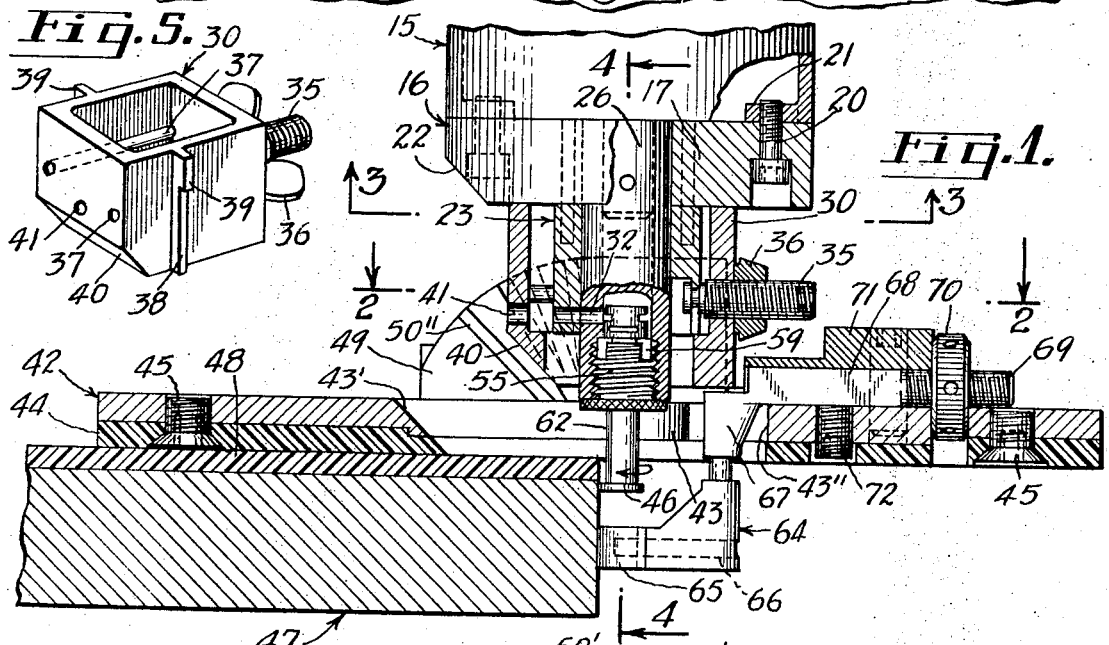
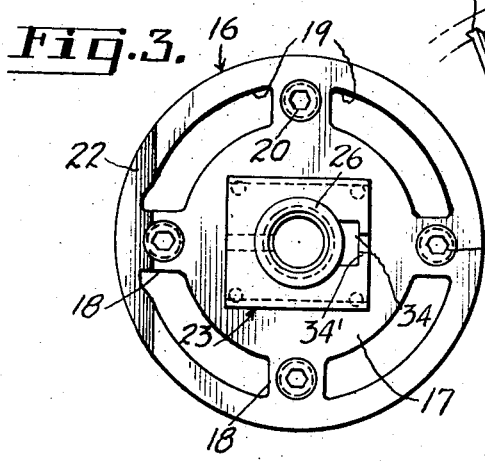
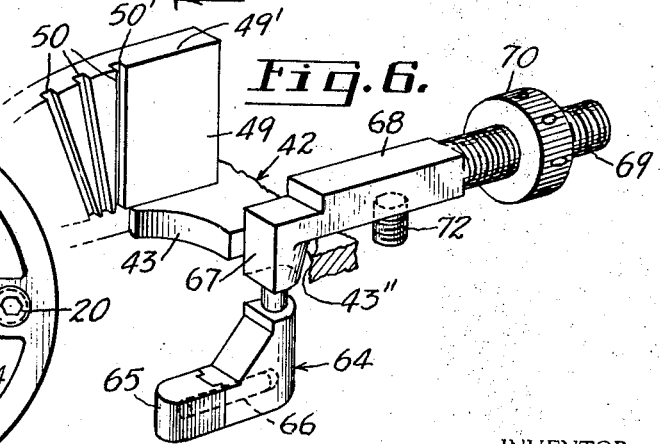
INVENTOR.
CHARLES SELOWITZ
BY
Howard E. Thompson
ATTORNEY June 30, 1970  C. SELOWITZ  3,517,712
WORKPIECE EDGE TRIMMING DEVICE
Filed March 23, 1967  2 Sheets-Sheet 2
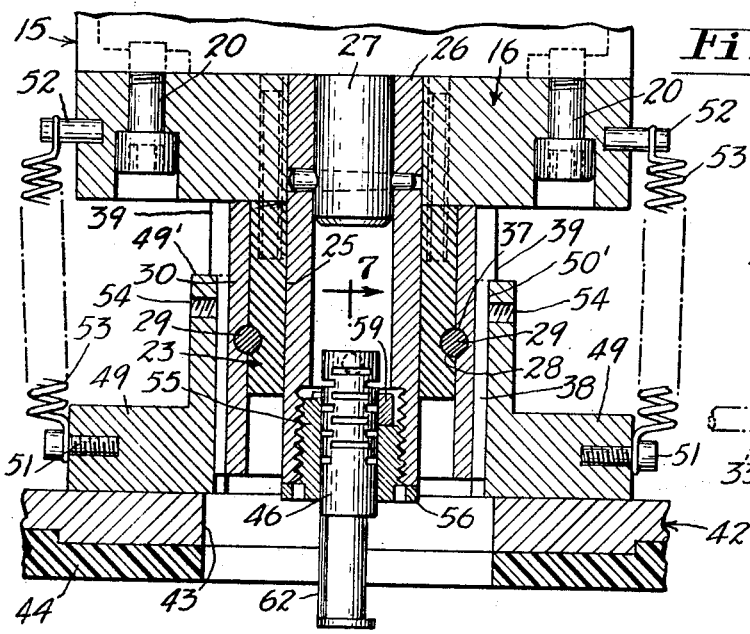
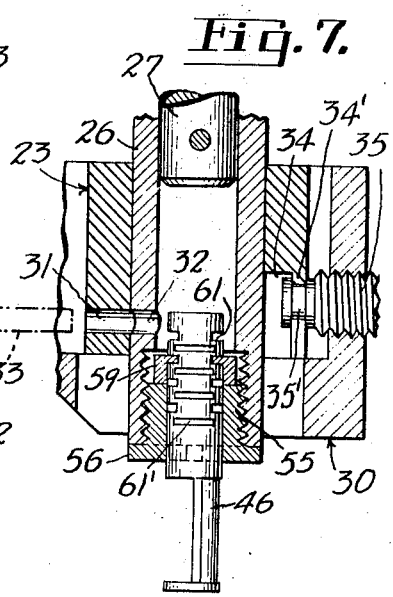
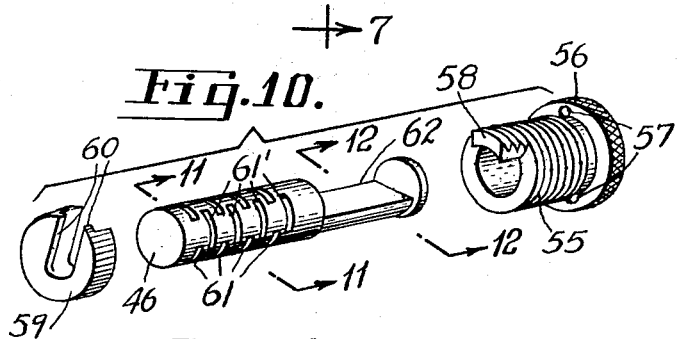
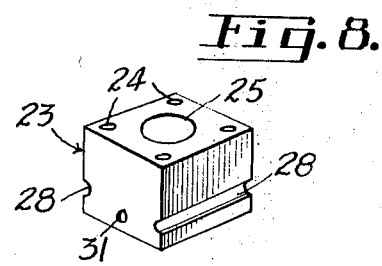
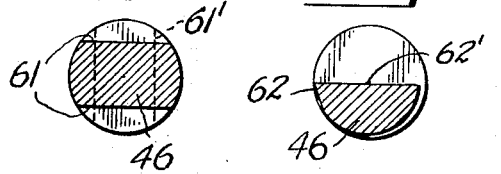
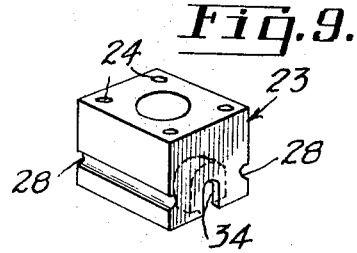
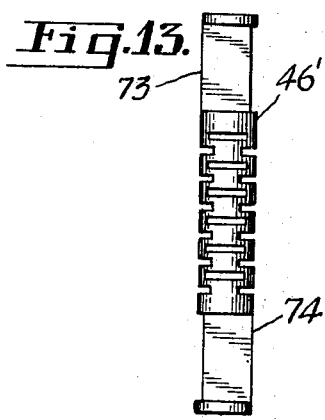
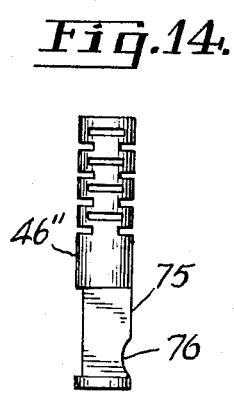
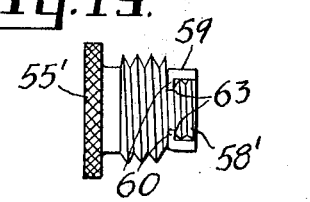
INVENTOR.
CHARLES SELOWITZ
BY
Howard C. Thompson
ATTORNEY `United States Patent Office`

3,517,712
Patented June 30, 1970

---

3,517,712
WORKPIECE EDGE TRIMMING DEVICE
Charles Selowitz, Rego Park, N.Y., assignor to Ronald
Selowitz, Deer Park, N.Y.
Filed Mar. 23, 1967, Ser. No. 625,429
Int. Cl. B27c 5/10
U.S. Cl. 144—134                                           7 Claims

ABSTRACT OF THE DISCLOSURE

A plastic top, table, board or the like edge trimmer device, comprising a base plate, on which is adjustably supported a tool supporting hollow head detachably mounted on a block coupled with an electric motor and wherein the motor shaft has means adjustably supporting a trimming tool projecting below the lower surface of said base plate, the base plate having below the tool a workpiece engaging guide.

---

Background of the invention (1) The invention deals with a portable trimmer assemblage operated by hand over the edge portion of a workpiece being trimmed and wherein the trimming tool can be quickly and easily shifted in the assemblage to present new cutter edges of the tool. Further, tools can be employed having tool cutter ends usable by reversing the tool in its mounting.

(2) To applicant's knowledge, it is new in the art to provide an assemblage of the type and kind defined where, in addition to providing several cutter edges, the tool can be adjusted to different angular positions in the base plate for trimming bevels on edges of a workpiece.

Summary of the invention

The invention deals with a trimmer assemblage comprising a base plate, including a facing shim, a hollow head detachable with a block supported in connection with an electric motor, the base plate and head having interengaging means for support of the head in different positions on the base plate. Further, where the motor shaft has means for keying and adjustably supporting a trimming tool and the base plate includes means for guiding the assemblage over an edge portion of a workpiece.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a sectional view through the trimmer assemblage as supported on the edge portion of a workpiece and showing only part of an electric motor, with parts broken away and parts in elevation.

FIG. 2 is a section on the line 2—2 of FIG. 1, omitting part of the background showing and indicating, in dotted lines, a modified adaptation.

FIG. 3 is a face view looking in the direction of the arrows 3—3 of FIG. 1 showing the attachment to an electric motor for support of the trimming assemblage.

FIG. 4 is an enlarged section on the line 4—4 of FIG. 1 omitting part of the construction and the workpiece illustrated in FIG. 1 and also showing, in section, part of the modified showing of FIG. 2.

FIG. 5 is a perspective view of the hollow tool supporting head.

FIG. 6 is a diagrammatic perspective view showing part of the base plate and the guide device assemblage.

FIG. 7 is a partial section on the line 7—7 of FIG. 4.

FIGS. 8 and 9 are perspective views of the support block detached.

FIG. 10 is an exploded perspective view of the trimming tool and its adjustable support means.

FIG. 11 is an enlarged section on the line 11—11 of FIG. 10.

FIG. 12 is an enlarged section on the line 12—12 of FIG. 10.

FIG. 13 is a face view of one modified form of trimming tool.

FIG. 14 is a face view of another modified form of trimming tool; and

FIG. 15 is a plan view of the adjustable support means for a tool showing a modification.

In illustrating one adaptation of the invention, in FIG. 1, 15 illustrates the lower portion of an electric motor for drive of the trimming device. Many types of motors are available for use. However, in the present brief showing, the motor is a type produced by Rockwell Porter Cable Company, identified as Model 310M. For mounting the assemblage on the motor, a ring-like casing 16 is employed, note FIGS. 1 and 3. At 17 is shown a hub joining the rim in web portions 18, thus forming circumferential apertures 19 for cooling the motor. In the webs 18 are screws 20 engaging flanges 21 on the motor 15, as seen, in part, in FIGS. 1 and 4. A lower corner of the casing 16 is bevelled for clearance, as seen at 22.

Mounted on the lower face of the hub 17 by four screws is a supporting block 23, the screws engaging threaded holes 24, as seen in FIGS. 8 and 9. The block 23 has a bore 25 for receiving an adaptor sleeve 26 pinned to the shaft 27 of the motor 15, note FIG. 4. The block 23 has, on opposed sides, longitudinal grooves 28 receiving coupling rods 29 in mounting a hollow head 30 for sliding movement on said block 23, note FIGS. 2 and 4. The head 30 is also shown in FIGS. 1, 5 and 7. The block 23 has an aperture 31 adapted to register with an aperture 32 in the sleeve 26, note FIG. 7, to receive a detachable key pin 33, indicated in dot-dash lines for holding the motor shaft from rotation in attachment of a tool, as later described.

The opposed side of the block 23 has a flanged key socket 34 opening through the lower surface thereof, note FIGS. 1, 7 and 9, for receiving the collar of a coupling screw 35 having a wing nut 36, FIGS. 1, 2 and 7, in securing the head 30 in adjusted position on the block 23.

Inner surfaces of side walls of the head 30 have recesses 37 to snugly receive the pins 29 and outer surfaces of said walls have vertical key ribs 38 with enlarged upper stops 39, note FIGS. 4 and 5. One corner of the head 30 has a clearance bevel 40, FIG. 1. The bevelled side of the head has an aperture 41 for reception of the pin 33 in entering apertures 31 and 32, note FIG. 1.

At 42 is shown the disc or base plate of the assemblage and at 43 is shown a central aperture, including a bevelled end 43' and a recessed end 43", FIGS. 1, 4 and 6. Mounted on the lower surface of the base plate is a height control facing shim 44, preferably of plastic material. This mounting is by way of four countersunk screws, two of which are shown at 45, FIG. 1. The shim 44 controls proper positioning of the trimming tool 46 of the assemblage with respect to the workpiece 47 or the plastic facing 48 thereof, which is to be trimmed. Here, it will be understood that shims of different thicknesses can be employed.

Mounted on the upper face of the base plate at sides of the aperture 43 are two L-shaped head supporting members 49, inner surfaces of the upstanding portions of which have five angularly arranged key grooves 50, FIGS. 1, 2, 4 and 6. The first groove 50' is perpendicular or at right angles to the base plate, FIGS. 4 and 6; whereas, the last groove 50" is at an angle of 45°, note FIG. 1. Mounted centrally of the members 49 are screws 51 in vertical alinement with pins 52 on the casing 16. Coupled with 51 and 52 are coil springs 53, which support the head 30 in seated position on the members 49, with stops 39 seated upon the upper curved surfaces 49' of members 49, note FIG. 4. To hold the head in seated position, other means can be employed, such as providing threaded apertures in the members 49 registering with all of the grooves 50, as indicated in dotted lines at 54, FIG. 2, and shown, in part, in section in FIG. 4 registering with the grooves 50'.

The lower end of the sleeve 26 is internally threaded to receive a threaded tool supporting collar 55 having a milled head 56, apertured as seen at 57 for a tightening wrench, note FIG. 10. The collar 55 has a projecting key segment 58 engaged by a split locking ring 59 having key flanges 60.

The trimming tool 46 is shown in detail in FIGS. 4, 7 and 10-12. On the shank of the tool are longitudinally spaced and alternately arranged pairs of key grooves 61, 61', the grooves 61' being arranged at 90° to the grooves 61, as clearly shown in FIG. 10. The key flanges 60 of the lock ring 59 can be positioned in each pair of grooves 61, 61' in adjusting the setting of different parts of the ground cutting edge 62 of the tool, note FIG. 12. This provides a long use of the tool, keeping in mind that this edge 62 can also be re-ground from time to time.

In re-setting the tool, all that is necessary is to remove the collar 55 and then re-set the lock ring 59 in a different pair of grooves 61, 61' and then re-couple the collar 55 with the sleeve 26.

In the showing in FIGS. 1, 4 and 7, the lock ring is illustrated in one position on the collar 55. However, noting FIG. 15 of the drawing, at 55' is shown a modified form of collar, wherein the key segment 58' has, at its inner end, grooves or recesses 63, into which the key flanges 60 of the lock ring 59 are positioned, thus definitely coupling the lock ring 59 with the collar 55.

Turning now to the showing in FIGS. 1, 2 and 6, at 64 is shown the workpiece engaging guide of the assemblage, comprising a substantially L-shaped member, in the forward edge of which is detachably supported a plastic workpiece engaging racing 65, the attachment being through the medium of a screw, indicated at 66. The facings 65 may vary in size and length. The upper portion of the guide is coupled with the offset end 67 of a rod 68, having a threaded end 69 engaged by a milled ring-type nut 70. The offset end 67 operates in the recess 43", as clearly illustrated in FIGS. 1 and 6. Supporting the rod 68 is a grooved supporting bracket 71 fixed to the base plate 42, as clearly seen in FIGS. 1 and 2, the base plate 42 and the shim being apertured to receive the nut 70, as clearly noted in FIGS. 1 and 2. Mounted in the base plate 42 is a setscrew 72 for retaining the guide 43 in fixed positions of adjustment. It will be apparent that the offset end 67 provides clearance beneath the head 30, as clearly noted in FIG. 1. It will be apparent that, with the adjustment provided, the guide 43 can be at all times properly positioned in the assemblage to bring the cutting edge 62 of the tool in proper location with respect to the edge of the workpiece 47, or the plastic facing 48 thereon.

In FIG. 13 of the drawing, I have shown at 46' a modified form of tool, where cutters are disposed at opposed ends of the tool, one end having a cutter edge, as seen at 73; whereas, the other end tool has a cutting edge, as at 74.

As the grooves on the shank of the tool are generally the same, as with the tool 46, no further description thereof is deemed to be necessary. A tool of the type and kind shown in FIG. 13 provides a long extended use in the reverse mounting thereof in the collar 55.

In FIG. 14 of the drawing, I have shown at 46" a slight variation of the tool 46 where the cutting edge 75 has, in one position thereof, a rounded cutter 76 for providing rounded trimmings on the facing 48 of a workpiece 47.

It will be understood that the sliding adjustment of the head 30 controls the proper setting of the tool with respect to the guide 43, as well as to the workpiece being operated upon and, in positioning the head 30 in the several angularly disposed grooves 50, the bevel performed on the facing 48 can be regulated. The cutaway or bevelled portions, as at 22, 40 and 43', facilitate positioning of the head 30 in the grooves 50", as will be apparent from a consideration of FIG. 1 of the drawing.

Considering the trimming tool and associated parts, FIGS. 10-12, it will be clear from a consideration of FIG. 2 that the ground cutting edge 62 is in line with the surface 62' centrally with respect to the axis of the tool 46. Further, it might be well to bring out that the threads of the collar 55 extend continuously onto the key segment 58, or are in threaded alinement therewith, as in FIG. 15, so that the collar can be freely threaded into the lower threaded end of the sleeve 26.

It will also be well to point out that the key socket 34 formed in the head 30 includes a border flange portion 34', best seen in FIG. 7 of the drawing, engaging the reduced collar 35' of the coupling screw 35. This structure is also illustrated in FIGS. 1, 2 and 3.

In use, in performing continued operations on common types of workpieces, after one trimming tool has been used to the state of requiring replacement, if another cutting tool is employed, the assemblage will not require any further adjustment. However, when tools have been reground, adjustments will then be required by rotation of the screw 35, which has an Allen-wrench socket, after the wing nut 35 has been loosened and, after the tool 46 has been properly positioned in the adjustment, the wing nut 36 is then tightened. In this connection, it is also understood that, in the event of wear upon the nylon or other plastic facing 65, adjustments will be made to maintain this facing in proper adjusted relationship with respect to the tool and to any adjustment of the tool.

Normally, in the trimming of the plastic facings 48, which may, in some instances, be Formica, the tools are preferably carbide tools. However, devices of the character defined can be used in the trimming of wooden, laminated wood or other workpieces in edging the same, in which event, steel types of tools can be used.

Having fully described my invention, what I claim as new and desire to secure by Letters Patent is:

1. A workpiece edge trimming device comprising a base plate having an aperture therein, a tool positioning head, means for detachably mounting said head in connection with an electric motor, means on the base plate and said head for adjusting the position of the head on the base plate in registration with said aperture, means on a drive shaft of said motor and arranged in said first named means for adjustably and detachably mounting a tool in connection therewith, said tool projecting through the aperture of said base plate, said base plate having a workpiece engaging guide arranged below said aperture for positioning said tool with respect to at least part of said workpiece, said second named means comprising a pair of head supporting members on said base plate, said members having a plurality of pairs of key grooves, key ribs on said head adapted to engage each pair of grooves, and means retaining the head on said members.

2. In a device of the character defined, a base plate having an aperture therein, a pair of members projecting from one surface of the plate adjacent said aperture, said members having on adjacent surfaces thereof angularly arranged and alined key grooves, a tool supporting head having, on opposed surfaces thereof, key ribs adapted for mounting in the grooves of said members in support of the head in different angular positions with respect to the base plate, means for retaining said head in connection with said members, and means on said head for detachably and adjustably coupling the same with tool driving means arranged within the head.

3. A portable trimmer assemblage comprising, in combination with an electric motor having a driven shaft, of a casing detachable with the motor, a block on said casing, a head detachably and adjustably coupled with said block, opposed sides of said head having elongated key ribs, an apertured base plate having on one surface thereof spaced upstanding head supporting members adjacent the aperture of said plate, adjacent surfaces of said supporting members having alined pairs of angularly disposed key grooves adapted to be engaged by the key ribs of said head in angular positioning of the head on said plate, means retaining the head in engagement with said members, means adjustable in the head and keyed to said block for adjusting relative positions of the head and block, a tool supporting sleeve coupled with said motor shaft and arranged in said block, means for detachably and adjustably coupling a trimming tool with said sleeve with the tool projecting through the aperture of said base plate, and a guide on the base plate adjacent said tool adapted to engage a workpiece in positioning the trimming tool with respect to at least part of said workpiece.

4. A device as defined in claim 1 wherein said first named means comprises a block detachably mounted on said motor, means for slidably keying the head for movement transversely of said block, and adjustable means in engagement with said block and head for moving the same into and retaining the same in different positions of slidable adjustment.

5. A device as defined in claim 1 wherein said third named means comprises a sleeve coupled with the drive shaft of the motor, a collar detachably mounted within the lower end of said sleeve, a split lock ring adjustably keyed to said tool and keyed to said collar, and means for keying said sleeve against rotation in said head during adjustment of said collar.

6. In a device as defined in claim 5, said tool having an elongated shank extending through said collar and lock ring, two sets of longitudinally spaced pairs of key grooves on said shank for selective engagement with said lock ring, one of said sets being at 90° to the other set, the grooves of one set being staggered longitudinally of the shank with respect to grooves of the other set, said tool being an expendable component adapted to be replaced by tools of similar shank structure, and such replacement tools constituting independent articles of commerce.

7. A device as defined in claim 5, wherein said collar has a projecting key segment engaged by said lock ring, said key segment having opposed recesses at the portion thereof adjacent said collar, and said lock ring having inwardly directed key flanges engaging opposed grooves on said tool and said spaced recesses, whereby said tool, collar and lock ring remain in assembled relation when moved with respect to said sleeve.

References Cited
UNITED STATES PATENTS

| | | | |
|---|---|---|---|
| 2,529,396 | 11/1950 | Hunt | 279—51 |
| 2,718,249 | 9/1955 | Hill | 145—64 |
| 2,943,654 | 7/1960 | Emmons. | |
| 2,952,281 | 9/1963 | Weber. | |
| 3,207,193 | 9/1965 | Godfrey et al. | |
| 3,346,026 | 10/1967 | Pluchino | 144—144 |

DONALD R. SCHRAN, Primary Examiner

U.S. Cl. X.R.

90—12